Nov. 1, 1960

B. L. TARMY 2,958,638

REACTION CONTAINER FOR CARRYING OUT RADIATION INDUCED CHEMICAL REACTIONS

Filed April 24, 1958

Barry L. Tarmy    Inventor

By Frank T. Johmann  Attorney

Nov. 1, 1960  B. L. TARMY  2,958,638
REACTION CONTAINER FOR CARRYING OUT RADIATION
INDUCED CHEMICAL REACTIONS
Filed April 24, 1958  2 Sheets-Sheet 2

Barry L. Tarmy  Inventor

By *Frank T. Johmann* Attorney

United States Patent Office 2,958,638
Patented Nov. 1, 1960

2,958,638
REACTION CONTAINER FOR CARRYING OUT RADIATION INDUCED CHEMICAL REACTIONS

Barry L. Tarmy, Summit, N.J., assignor to Esso Research and Engineering Company, a corporation of Delaware Filed Apr. 24, 1958, Ser. No. 730,703

3 Claims. (Cl. 204—193)

This invention relates to methods and apparatus for carrying out chemical reactions in a gaseous state by means of high energy electron radiation. Particularly, the invention relates to a reaction container capable of enclosing gaseous reactants under high pressure and at the same time permitting the entrance of electrons into the container from an external source.

It has been known that many chemical reactions may be promoted or made to take place by the use of high energy electron radiation. However, heretofore, electron radiation has been very difficult to effectively use when the reaction is to be carried out under high pressure. Thus, the thick metal walls required for pressure vessels constitute a severe limitation since the bulk of the energy of the electron stream is absorbed by the walls of the vessel. It has now been found that by forming a portion of the reaction vessel wall with a plurality of spaced recesses of small diameter and having a thin bottom wall thickness, that the strength of the pressure vessel is not materially reduced. And at the same time, by directing an electron beam at these recesses, a high proportion of the electrons will pass through these thin bottom walls into the reaction vessel. Preferably, the thin bottom wall of each recess is integral with the remainder of the reaction vessel wall. In this manner, heat resulting from electrons absorbed by the thin bottom wall of the recess is rapidly dissipated by conduction to the surrounding thicker metal portions. Also, the thick wall portions may be conveniently provided with cooling passages so that the heat generated may be eventually removed altogether from the system by a circulating cooling medium. Thus, large dosages of electron radiation may be directed at the reaction container without melting the thin bottom walls of the recesses. By the apparatus described above, a practical means has now been provided to carry out by electron bombardment chemical reactions such as alkylation, polymerization and cracking which occur best in a gaseous phase and under high pressure.

The invention is illustrated in the following drawings in which.

Figure 1:
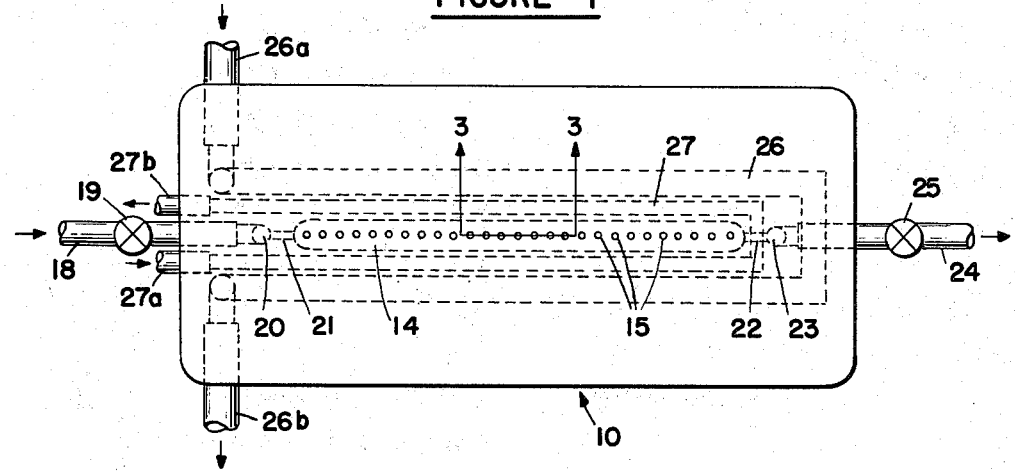
Figure 1 is a top plan view of the reaction container of the invention.
Figure 2:
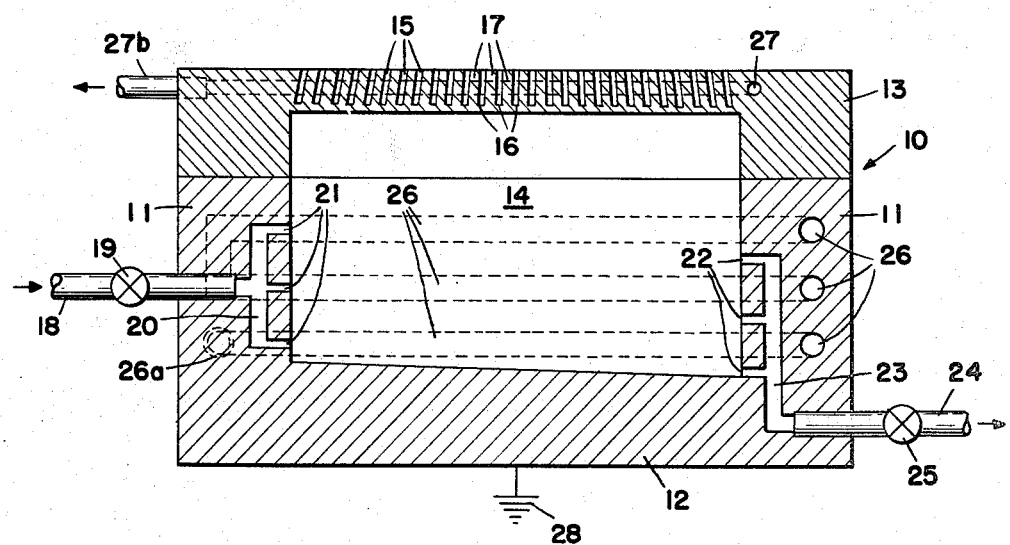
Figure 2 is a side view, partly in section, of the reaction container of Fig. 1.
Figure 3:
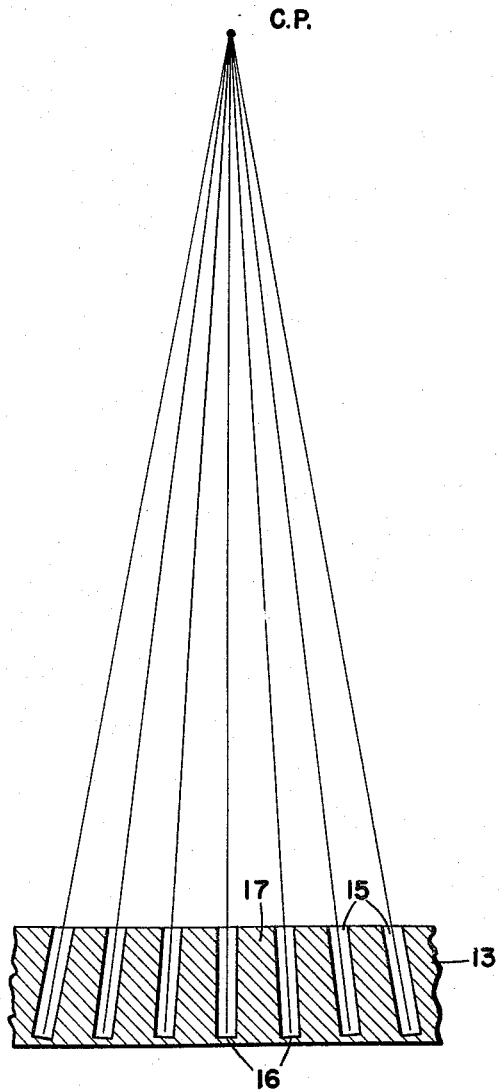
Figure 3 is an enlarged sectional view, taken along the lines 3—3 of Figure 1, which illustrates in detail the recesses formed in the wall of the reaction container.

Referring now to the drawings, the reaction vessel of the invention is indicated generally at 10. It includes the side and end walls 11, a bottom wall 12 which preferably has a sloping inner side for drainage purposes, and a top wall 13, said walls enclosing the reaction space 14. The top wall 13 is formed with at least one linear series of spaced recesses 15, each recess in turn having a bottom wall 16 which is generally about 5 to 20 mils thick and represents about 1 to 5% of the thickness of the wall 13. The center line of each recess in the linear series constitutes a radius projecting from a common center point (C.P.), and all of said radii lie in the same plane (see Fig. 3). The reactants, in the form of gases under pressure, are passed into the reaction vessel, through the feed line 18 and control valve 19 into a manifold 20, which directs the reactants through the short feed lines 21 into the reaction space 14. After passing through the reaction space 14, where the gaseous mixture of reactants is subjected to electron bombardment, the gaseous product material emerges through the short outlet lines 22, into the manifold 23 and finally into the outlet line 24 controlled by the valve 25. By having a series of short feed lines 21 and short outlet lines 22, a more even flow of the gases through the reaction space is assured in continuous processing, and channeling of the gas is avoided. It will be obvious that the reaction vessel may be readily used for either continuous reactions or for batch reactions. In the former case, both valves 19 and 25 are left open and the gases passed continuously through the system. If a batch process is used, then valve 25 is closed, the gases are forced under pressure through valve 19 into the vessel after which valve 19 is closed, thus entrapping the gas in the vessel until the radiation is completed, after which valve 25 is opened to release the product.

Since most gaseous chemical reactions are best carried out at definite temperatures, it is desirable to also provide heat exchange means for maintaining the reactants at definite temperatures. To do this, a circulating passage 26 is provided in the walls 11 of the vessel through which either a coolant or heating agent may be circulated, entering the passage at 26a and passing out of the system at 26b. Since a considerable degree of heat will be generated by absorption of electrons as the main electron stream passes through the bottom walls 16 of the recesses 15, it is desirable to also cool this portion of the reaction cell. This is most conveniently done by providing a cooling passage 27 adjacent said recesses and having an inlet at 27a and an outlet at 27b.

The reaction container should also be grounded as shown at 28, at a location opposite the recesses 15 and the incoming electron beam, while all other grounded connections are preferably electrically insulated to prevent the electron flow from being short-circuited and deviated from passing into the interior of the reaction vessel.

In constructing the reaction cell, it is necessary that sufficient wall thickness be provided to withstand the operating pressures and yet the bottom walls of the recesses should be thin enough to allow a substantial proportion of the electrons to penetrate into the interior of the vessel. Thus, for reaction containers constructed of steel and designed to operate at pressures up to 10,000, preferably 100 to 1,000 p.s.i.g., the recesses may range from $\frac{1}{16}$ to $\frac{1}{4}$ inch diameter and have a bottom wall thickness of 5 to 100 mils, while the main walls of the container may range from $\frac{1}{4}$ to 1 inch thickness. The spacing between the recesses should generally be at least equal to the diameter of the recess and preferably greater. The optimum relationship between pressure, recess diameter and the bottom wall thickness of the recess can be defined by the following equation:

$$t = \sqrt{\frac{KP}{S \max.}} \left(\frac{d}{2}\right)$$

wherein:

$t$ is the thickness in inches of the bottom wall of the recess.

$P$ is the pressure in p.s.i. at which the reaction container is to be operated.

$S$ max. is the maximum allowable stress in terms of p.s.i. of the material of construction.

$K$ is a factor of 0.8.

$d$ is the diameter of the recess.

The preceding equation is well known and has been described in various mechanical engineering handbooks, e.g. Mark's Handbook (5th edition, 1951, page 477).

For example, in a reaction container constructed of mild steel ½" plate, a series of recesses may be provided in a portion of the plate consisting of square sections of ³⁄₃₂" x ³⁄₃₂" and having a bottom wall thickness of 15 mils (0.015 inch). These recessed areas should be at least ¹⁄₁₆ inch apart. In such a system, when a high energy electron beam is directed at the 15 mil thick bottom wall of the recesses, about 65% of the electron energy will pass into the reaction cell. Furthermore, such a cell can be safely operated at pressures as great as about 2,000 p.s.i. and temperatures up to about 1200° F. By constructing the reaction cell wall of titanium which is less absorbent to electrons, and using the same wall thickness, about 85% of the electron energy would enter the cell, although the operating pressure would be somewhat reduced. Still other metals may be used to construct the container, although preferred metals are those having high strength and a low atomic number such as beryllium, magnesium, aluminum, steel, etc. and their alloys.

The electron source to be used with the reaction container can be any convenient source of high energy ionizing electrons known to the art, such as a Van de Graaff generator, resonant transformers, traveling wave linear accelerators, betatrons, etc. In order to ionize and be useful, the electrons must have an energy greater than 30 electron volts and for practical purposes will generally have an energy of 0.05 m.e.v. (million electron volts) to 10.0 m.e.v., preferably 0.5 to 3.0 m.e.v. The dosage required for most chemical reactions will be in the order of about .01 to 1,000 megaroentgens, usually about 0.1 to 100 megaroentgens. The electron beam will be generally about ⅛ to ¼ inch in diameter. By means known to the art, the electron beam may be made to sweep over the line of recesses formed in the container wall or a sweeping pulsed electron beam may be provided, e.g. the electron beam from a traveling wave linear accelerator. In this latter instance, the pulsed beam may be synchronized so that as it sweeps, the maximum flow of electrons occurs when the beam is directed at a recess portion and the minimum electron flow occurs as the beam sweeps from one recessed portion to the next. Means and mechanisms of providing the above types of electron radiation including the sweeping beam and the pulsed sweeping beam are known in the art and form no part of this invention. Rather, the present invention is only directed towards the reaction vessel adapted to utilize said electron beams.

To further illustrate the invention, a chemical reaction was carried out in a reaction vessel formed of mild steel and of the type shown in the present drawing. Specifically, in this reaction vessel the top metal wall was .657" thick, the side and bottom walls being substantially thicker to allow for the cooling passage. A single straight line of 27 bores or recesses of ³⁄₃₂" diameter spaced 0.204" apart from each other were provided in the top wall. The bores were drilled to a depth within about 0.015" from the bottom of the top plate, i.e. the bottom wall of each recess was about 15 mils thick. Thus, a series of thin wall portions was formed of about 0.015" wall thickness, alternating with thicker wall portions of 0.657" thickness. The bores were drilled at a slight angle to each other, the center line of each bore forming a radii projecting downwardly from a common center located about 20" away from the top of the center bore. Thus the center line of the center bore was directly perpendicular to the top surface of the top wall, i.e. vertical, while the center lines of the other bores were all at a slight angle from the vertical, the angle increasing as the bores were further removed from the center bore.

The reactants used were a mixture consisting of 12 mole percent ethylene and 88 mole percent propane. This gaseous mixture was preheated to 650° F., and was then pressured into the reaction space 14 of the vessel through the appropriate inlet line 18 and the inlet valve 19 was then closed. The outlet valve 25 being of course closed. The gaseous mixture was maintained at a temperature of 650° F. and a pressure of 150 p.s.i.g. during the reaction. A liquid medium (Hydrotherm 900) maintained at a temperature of about 650° F. was circulated through the cooling passage 26 in order to maintain the temperature of the reactants constant at 650° F. during the reaction.

The electron source was a 2 m.e.v. Van de Graaff electron accelerator, model AK–5, manufactured by High Voltage Engineering Corporation. The electron beam was caused to sweep back and forth in an arc over the single row of bores at a rate of 200 times per second. The focal point of the arc was about 20" away from the center bore of the reaction container and the diameter of the beam was ¼". A cooling fluid (Hydrotherm 900) was circulated through the cooling passage 27 adjacent the recesses in the top wall in order to prevent the thin bottom wall of said recesses from melting.

The contents of the reaction container were then radiated for one minute, the electron intensity from the Van de Graaff accelerator being 14.8 megaroentgens per hour. The contents of the reaction container were next analysed and 1 wt. percent conversion was found to have been effected. The 1 wt. percent product consisted of the following: .053 wt. percent of hydrogen, methane and ethane; 0.38 wt. percent n-propylene, n-butylene and n-pentylene; 0.16 wt. percent isobutylene and 0.39 wt. percent isopentylene.

While the amount of product formed was low, i.e. 1 wt. percent based on the feed, this was deliberately done in order to more effectively measure the results of the reaction. Thus, a much higher degree of reaction could have been obtained by increasing either the intensity of radiation or the time of radiation. However, the example serves to demonstrate the operability of the reaction vessel of the invention and the manner in which it is to be used.

While the preceding example was carried out using a sweeping beam having a constant rate of electron emission, a more effective method would be by using a pulsed sweeping beam synchronized such that the maximum electron flow occurs when the beam is directed at a thin-wall portion of the container. Other variations, of course, are possible without departing from the scope of the present invention. One such variation would be the provision of several linear series of recesses instead of the single linear series illustrated in the drawing. By having several linear series and causing the electron beam to scan a plane rather than a line, the amount of electrons entering the reaction container can be greater increased.

What is claimed is:

1. A reaction container for electron irradiations comprising a metal vessel adapted to contain normally gaseous reactants under a pressure of at least 100 p.s.i.g. and inlet and outlet means for admitting reactants to and removing products from said vessel, a wall of said vessel being of unitary metal construction and having a plurality of small, spaced, inwardly directed recesses, the bottom walls of said recesses having a thickness in the range of 5 to 100 mils and permitting the passage of at least 65% of the electrons having an energy over 30 electron volts impinging thereon, said wall also containing cooling conduits integral within said wall and in cooling relationship to said bottom walls.

2. The reaction container of claim 1 wherein said vessel is adapted to accommodate pressures up to 10,000 p.s.i.g. and wherein said recesses are cylindrical with a diameter in the range of ¹⁄₁₆ to ¼".

3. A reaction container according to claim 1 wherein the center line of each of said recesses coincides with radii projecting from a common external center point and wherein all of said radii lie in a common plane.

References Cited in the file of this patent

UNITED STATES PATENTS 2,429,217    Brasch _____ Oct. 21, 1947